(12) United States Patent  (10) Patent No.: US 10,836,433 B2
Noguchi  (45) Date of Patent: Nov. 17, 2020

(54) REAR SUBFRAME STRUCTURE

(71) Applicant: HONDA MOTOR CO., LTD., Tokyo (JP)

(72) Inventor: Satoru Noguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/575,705

(22) Filed: Sep. 19, 2019

(65) Prior Publication Data

US 2020/0102011 A1  Apr. 2, 2020

(30) Foreign Application Priority Data

Sep. 27, 2018  (JP) .................................. 2018-183013

(51) Int. Cl.
  *B62D 21/02*  (2006.01)
  *B62D 21/11*  (2006.01)
(52) U.S. Cl.
  CPC .............. *B62D 21/02* (2013.01); *B62D 21/11* (2013.01)
(58) Field of Classification Search
  CPC ........ B62D 21/02; B62D 21/11; B62D 21/09; B62D 21/155; B62D 25/08
  USPC ......................................................... 280/781
  See application file for complete search history.

(56) References Cited

U.S. PATENT DOCUMENTS

| | | | | |
|---|---|---|---|---|
| 5,562,308 A | * | 10/1996 | Kamei | B60G 3/20 180/377 |
| 6,511,096 B1 | * | 1/2003 | Kunert | B60G 7/02 280/124.109 |
| 9,505,437 B2 | * | 11/2016 | Leibl | B62D 21/07 |
| 2004/0108677 A1 | * | 6/2004 | Sekiguchi | B62D 21/11 280/124.109 |
| 2006/0170206 A1 | * | 8/2006 | Mitsui | B60T 17/046 280/797 |

(Continued)

FOREIGN PATENT DOCUMENTS

| JP | 07246464 A | * | 9/1995 |
|---|---|---|---|
| JP | H07-246464 A | | 9/1995 |

(Continued)

OTHER PUBLICATIONS

Japanese Office Action received in corresponding JP patent application No. 2018-183013 dated Mar. 24, 2020 with English translation (7 pages).

*Primary Examiner* — Ruth Ilan
*Assistant Examiner* — Kurtis Nielson
(74) *Attorney, Agent, or Firm* — Rankin, Hill & Clark LLP (57) ABSTRACT

A rear subframe structure including a rear subframe disposed on a rear side of a vehicle is provided. The rear subframe includes: a pair of right and left longitudinal members extending in a longitudinal direction of the vehicle; and a front cross member extending in a vehicle width direction between the pair of right and left longitudinal members, and a rear cross member extending in the vehicle width direction between the pair of right and left longitudinal members. The front cross member and the rear cross member are spaced apart in the longitudinal direction by a predetermined distance. Each of the pair of right and left longitudinal members has a protruding portion between the front cross member and the rear cross member; the protruding portion protrudes in a direction intersecting the longitudinal direction.

7 Claims, 8 Drawing Sheets

(56) References Cited

U.S. PATENT DOCUMENTS

| | | | | |
|---|---|---|---|---|
| 2006/0181071 A1* | 8/2006 | Mitsui | B62D 25/08 | 280/784 |
| 2009/0212548 A1* | 8/2009 | Frasch | B62D 21/11 | 280/785 |
| 2011/0260503 A1* | 10/2011 | Fujii | B62D 21/152 | 296/205 |
| 2013/0270030 A1* | 10/2013 | Young | B62D 21/155 | 180/274 |
| 2014/0368000 A1* | 12/2014 | Komiya | B62D 21/11 | 296/193.07 |
| 2016/0121931 A1* | 5/2016 | Tamaoki | B62D 21/02 | 296/187.09 |
| 2016/0152272 A1* | 6/2016 | Tomikuda | B62D 21/11 | 296/203.01 |
| 2018/0148095 A1* | 5/2018 | Lipa | B60G 7/02 | |
| 2018/0178853 A1* | 6/2018 | Friesen | B21B 1/22 | |
| 2018/0201322 A1* | 7/2018 | Schmalzrieth | B62D 27/065 | |
| 2018/0237071 A1* | 8/2018 | Okumoto | B60G 3/20 | |
| 2019/0276079 A1* | 9/2019 | Zuber | B62D 21/02 | |
| 2019/0291788 A1* | 9/2019 | Tsukamoto | B60G 13/003 | |
| 2020/0102013 A1* | 4/2020 | Sakai | B62D 21/02 | |
| 2020/0156706 A1* | 5/2020 | Morimoto | B62D 21/155 | |
| 2020/0207417 A1* | 7/2020 | Tanaka | B62D 21/11 | |

FOREIGN PATENT DOCUMENTS

| | | | | |
|---|---|---|---|---|
| JP | 3649461 | | 5/2005 | |
| JP | 2013103540 A | * | 5/2013 | B62D 21/11 |
| JP | 2017-087994 A | | 5/2017 | |

\* cited by examiner

REAR SUBFRAME STRUCTURE

CROSS-REFERENCE TO RELATED APPLICATION

This application claims the benefit of foreign priority to Japanese Patent Application No. JP2018-183013, filed Sep. 27, 2018, which is incorporated by reference in its entirety.

TECHNICAL FIELD

The present invention relates to a rear subframe structure mounted on a rear side of a vehicle such as an automobile.

BACKGROUND ART

A subframe structure including a subframe is disclosed, for example, in Japanese Patent No. 3649461; the subframe includes a pair of right and left side members, and a front cross member and a rear cross member disposed spaced apart from each other in the longitudinal direction of a vehicle. A drive source (power unit) such as an engine and a motor is supported by the subframe.

In the subframe structure disclosed in JP3649461B, for example, when a load is applied to the vehicle during collision of the vehicle, the subframe may disadvantageously deform at a portion between the front cross member and the rear cross member.

With the above drawback of the conventional structure in view, the present invention seeks to provide a rear subframe structure which can enhance the stiffness and the strength at a portion between the front cross member and the rear cross member.

SUMMARY

The present invention proposed to attain the above object provides a rear subframe structure including a rear subframe disposed on a rear side of a vehicle, the rear subframe comprising: a pair of right and left longitudinal members extending in a longitudinal direction of the vehicle; and a front cross member extending in a vehicle width direction between the pair of right and left longitudinal members, and a rear cross member extending in the vehicle width direction between the pair of right and left longitudinal members, the front cross member and the rear cross member being spaced apart in the longitudinal direction by a predetermined distance, wherein each of the pair of right and left longitudinal members has a protruding portion between the front cross member and the rear cross member, the protruding portion protruding in a direction intersecting the longitudinal direction.

DETAILED DESCRIPTION OF THE INVENTION

One embodiment of the present invention will be described in detail with reference to the drawings where necessary. In the drawings, front and rear directions refer to corresponding directions in the longitudinal direction (i.e., front-rear direction) of a vehicle, right and left directions refer to corresponding directions in the vehicle width direction (i.e., lateral direction or right-left direction) of the vehicle, and upper and lower directions refer to corresponding directions in the vertical direction (i.e., upper-lower direction) of the vehicle.

Figure 1:
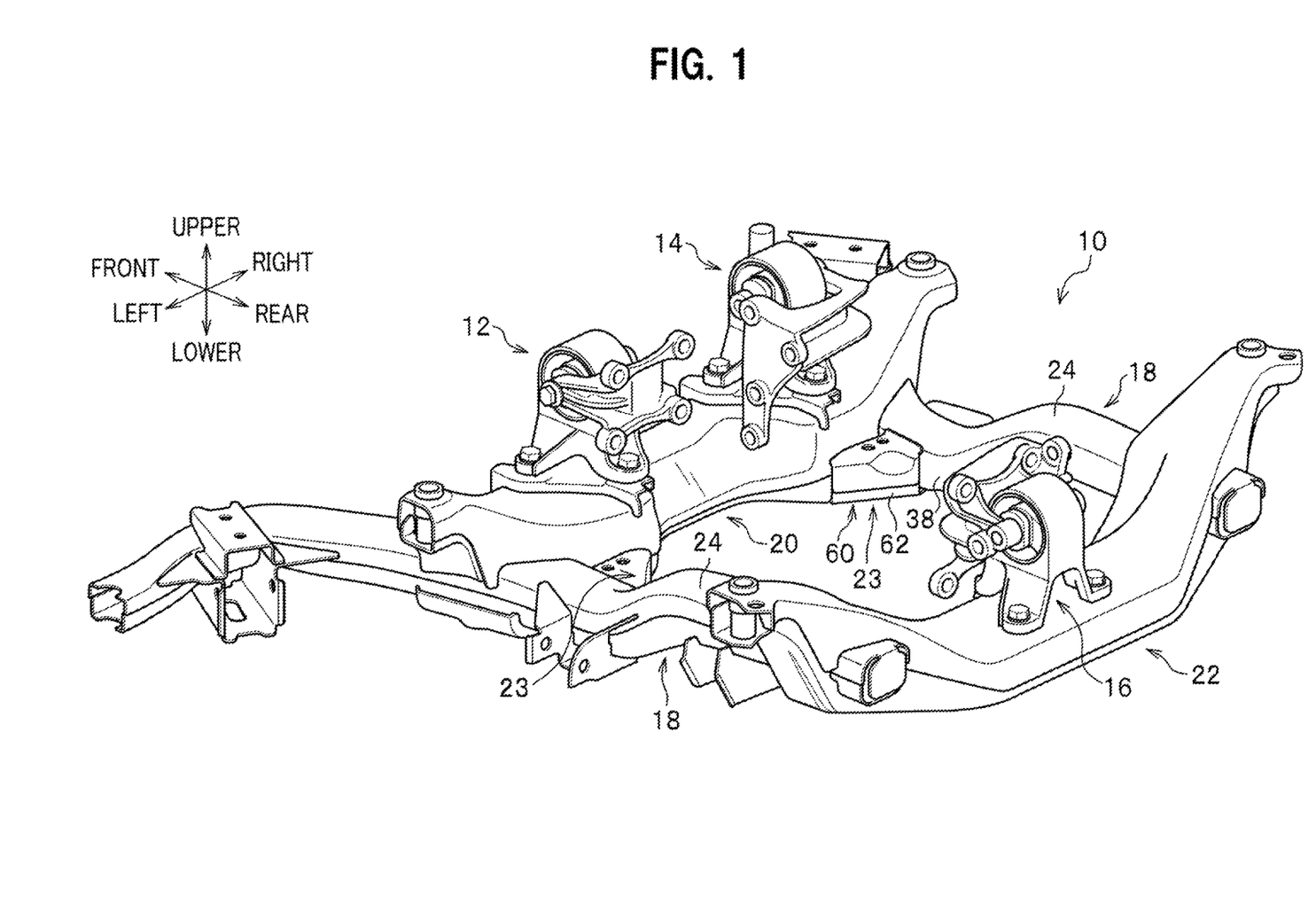
FIG. 1 is a perspective view, as viewed from an obliquely upper side, illustrating a rear side of a vehicle in which a rear subframe according to one embodiment of the present invention is built.

As seen in FIG. 1, a rear subframe (subframe) 10 according to this embodiment is disposed on a rear side of a vehicle. The rear subframe 10 is mounted under a pair of right and left rear side frames (not shown) extending in a longitudinal direction of the vehicle. The rear subframe 10 serves to support a suspension device for rear wheels (not shown) as well as to support a power unit (drive source such as a motor and an engine) P through first, second and third vibration isolators 12, 14, 16 to be described later (see FIG. 2).

Figure 2:
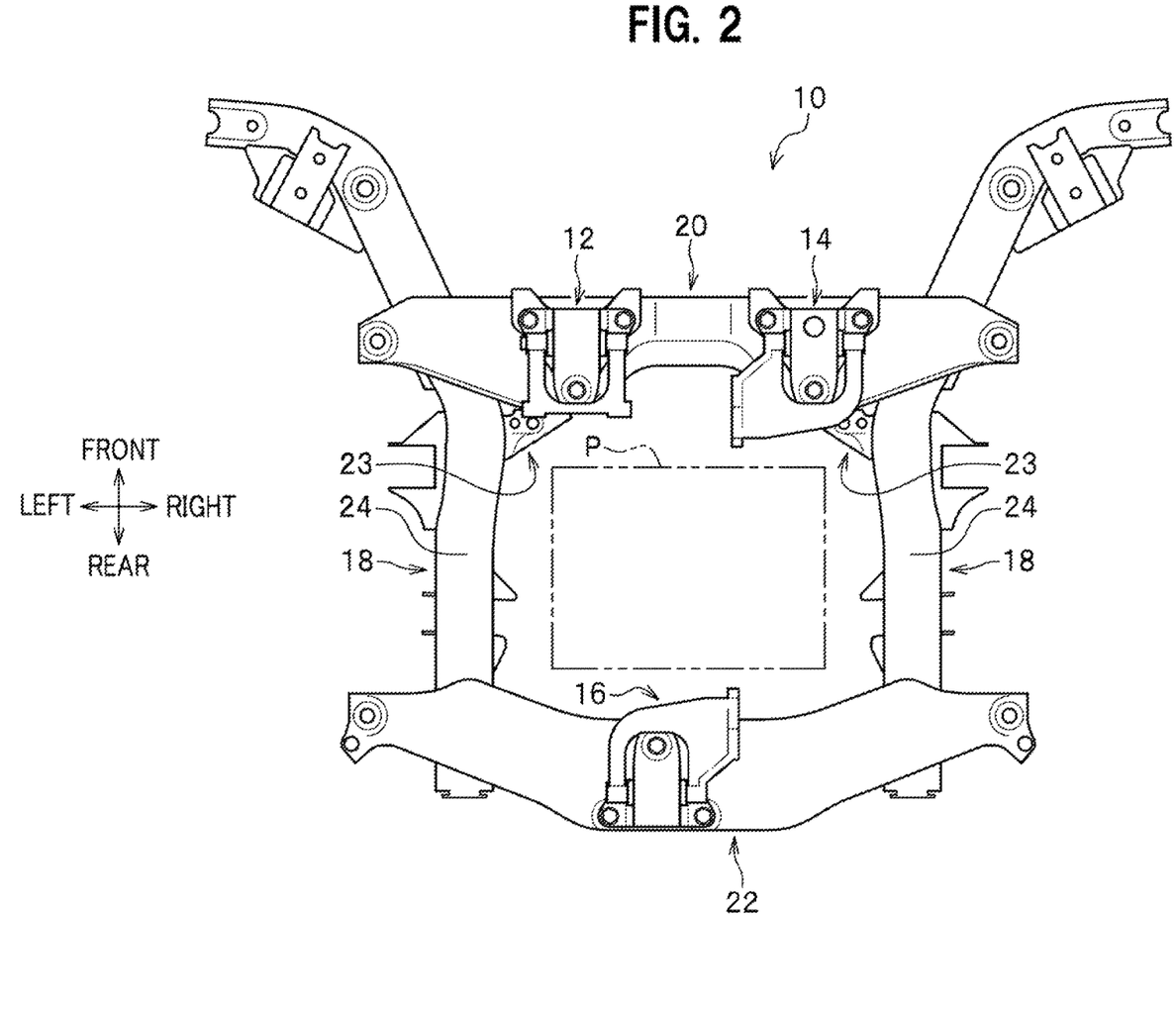
FIG. 2 is a top view of the rear subframe shown in FIG. 1.
Figure 3:
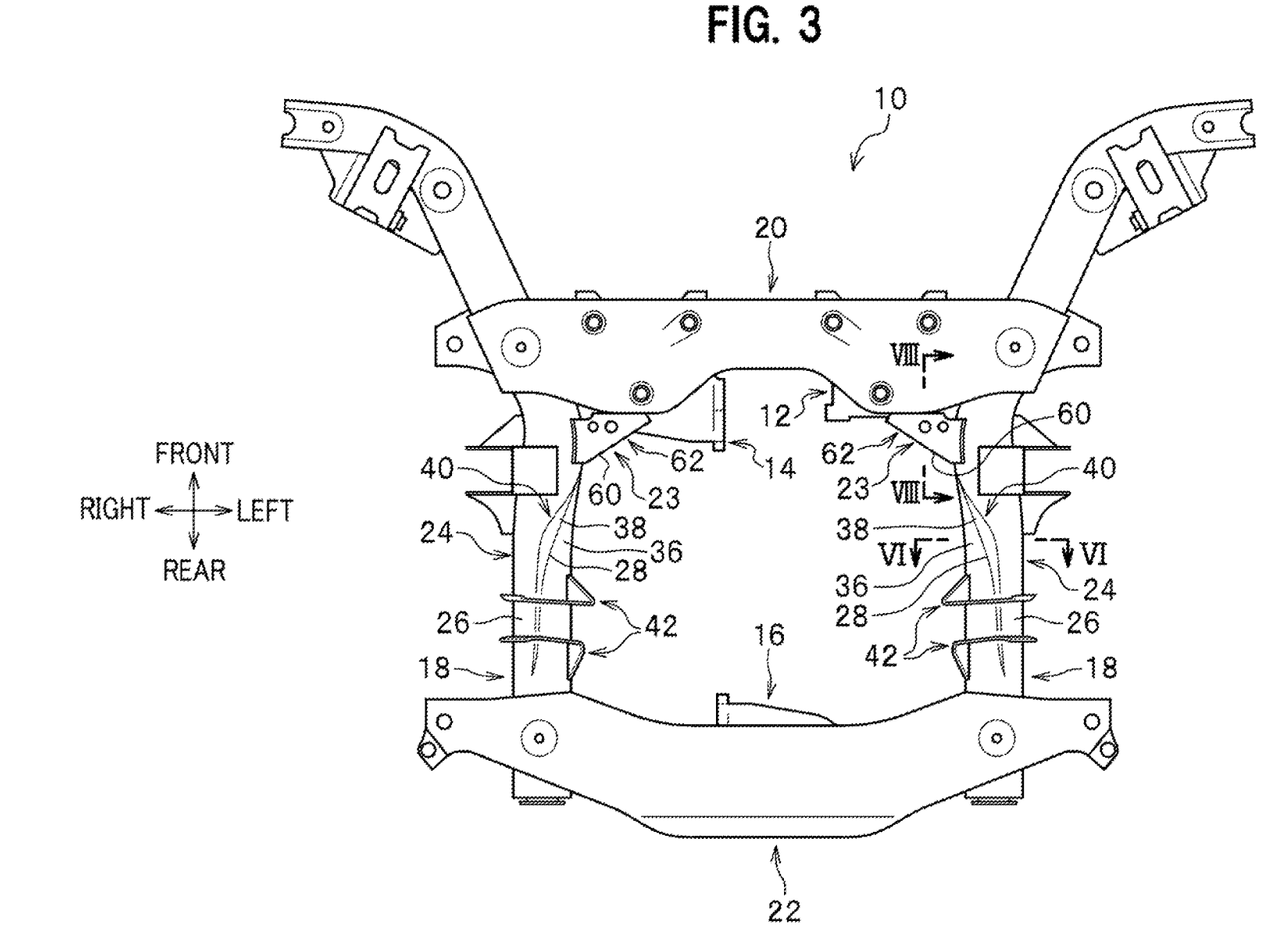
FIG. 3 is a bottom view of the rear subframe shown in FIG. 2.

As seen in FIGS. 2 and 3, the rear subframe 10 includes a pair of right and left longitudinal members 18, 18 extending in the longitudinal direction of the vehicle, and cross members extending in the vehicle width direction between the pair of right and left longitudinal members 18, 18. The cross members may be a front cross member 20 fixed to the pair of right and left longitudinal members 18, 18 at forward portions of the right and left longitudinal members 18, 18, and a rear cross member 22 fixed to the pair of right and left longitudinal members 18, 18 at rearward portions of the right and left longitudinal members 18, 18. The front cross member 20 and the rear cross member 22 are disposed spaced apart in the longitudinal direction of the vehicle by a predetermined distance.

As seen in FIGS. 1 to 3, a pair of right and left gussets 23, 23 are provided at connecting portions (joint portions), at which the pair of right and left longitudinal members 18, 18 and the front cross member 20 are connected; the gussets 23, 23 are configured to connect each of the right and left longitudinal members 18, 18 and the front cross member 20. The front cross member 20 has a pair of right and left oblique portions at the rear side thereof; as seen in FIG. 3, the right and left oblique portions jut out rearward from a central portion of the rear side of the front cross member 20 and extend toward oblique edges of oblique portions 40 to be described later. Each of the gussets 23, 23 has an oblique portion 60 extending obliquely at a corner portion formed by each of the right and left longitudinal members 18, 18 and the front cross member 20 (i.e., a connecting portion where each of the right and left longitudinal members 18, 18 and the front cross member 20 are connected). Further, at the corner portion formed by each of the right and left longitudinal members 18, 18 and the front cross member 20, each of the gussets 23, 23 is disposed at a position rearward of the front cross member 20 in the longitudinal direction of the vehicle and inward of the right and left longitudinal members 18, 18 in the vehicle width direction. Details of the gussets 23, 23 will be described later.

A first vibration isolator 12 and a second vibration isolator 14 are disposed spaced apart in the vehicle width direction by a predetermined distance; the first vibration isolator 12 is provided on the left side portion of the front cross member 20, and the second vibration isolator 14 is provided on the right side portion of the front cross member 20. A third vibration isolator 16 is disposed on a central portion of the rear cross member 22 that is a laterally central portion in the vehicle width direction. The power unit P is supported by the front cross member 20 and the rear cross member 22 through the first vibration isolator 12, the second vibration isolator 14, and the third vibration isolator 16, so that a three-point floating structure is provided.

Each of the first, second and third vibration isolators 12, 14, 16 includes a mount portion having a plurality of leg portions (three leg portions in this embodiment). The first, second and third vibration isolators 12, 14, 16 are attached and fastened to the front cross member 20 and the rear cross member 22 using bolts and nuts (not shown) to be fastened to the mount portions.

Figure 6:
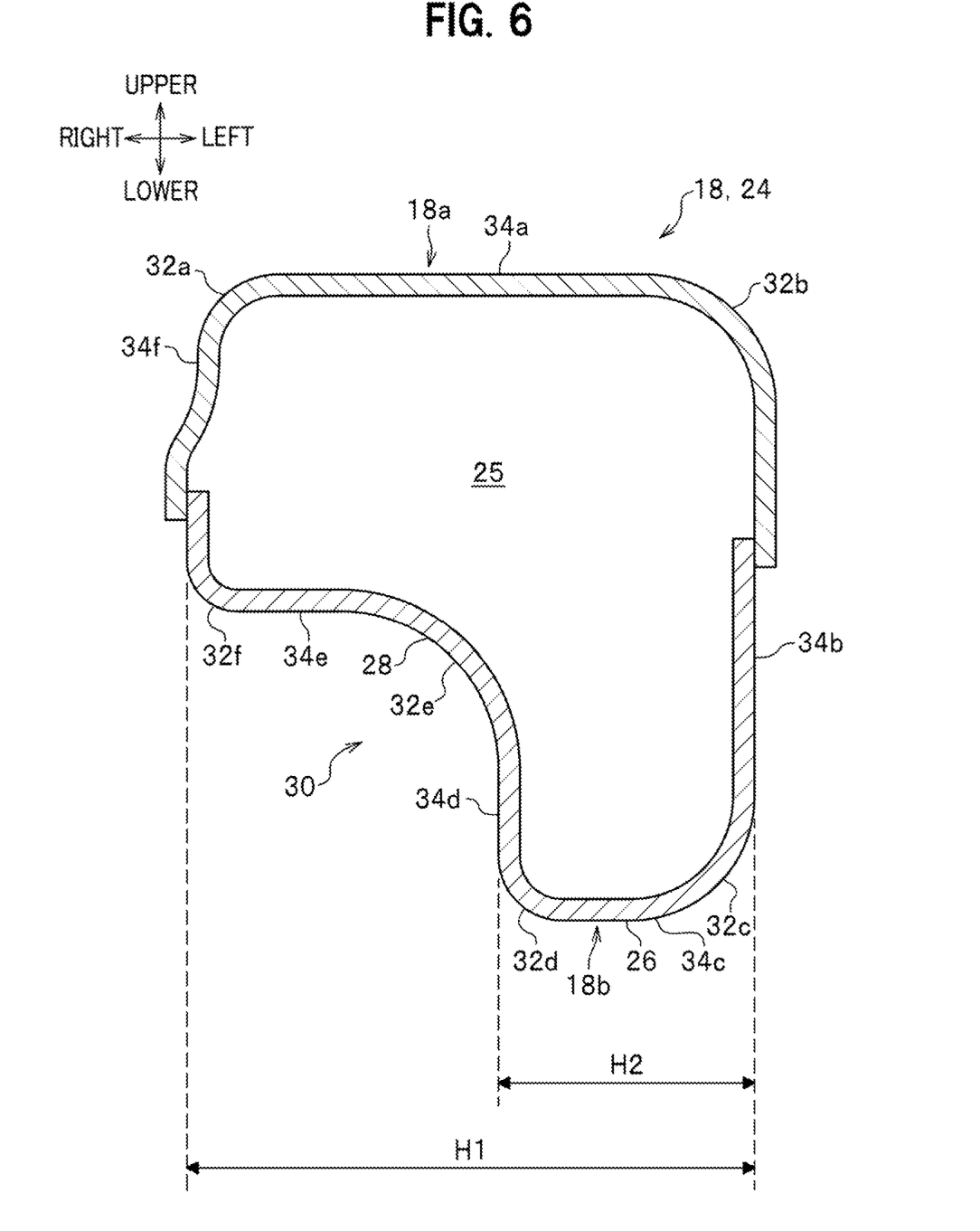
FIG. 6 is an enlarged sectional view taken along the line VI-VI of FIG. 3.

Each of the right and left longitudinal members 18, 18 has a straight portion 24 between the front cross member 20 and the rear cross member 22; the straight portion 24 extends substantially straight in the longitudinal direction (front-rear direction) of the vehicle. The straight portion 24 includes an upper wall portion 18a (i.e., a first half portion) in the form of a U-shaped cross section, and a lower wall portion 18b (i.e., a second half portion) in the form of a U-shaped cross section. As seen in FIG. 6, the upper wall portion 18a and the lower wall portion 18b are joined together at their ends to form a closed hollow portion 25.

Figure 4:
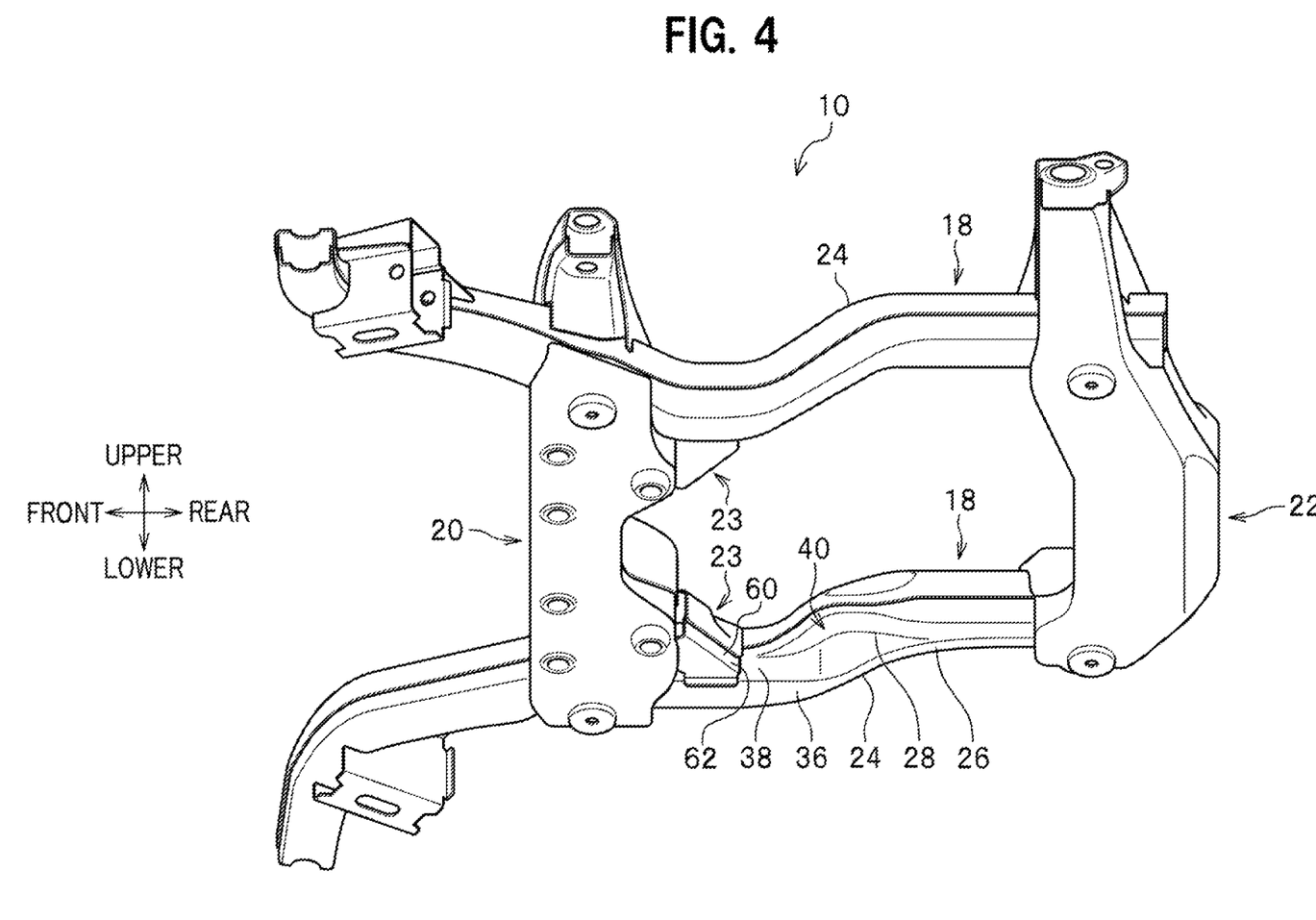
FIG. 4 is a perspective view illustrating the rear subframe shown in FIG. 3 as viewed from an obliquely lower side.

As seen in FIGS. 3, 4 and 6, the lower wall portion 18b of each of the right and left longitudinal members 18, 18 has a protruding portion 26 that protrudes (juts out) downward, at a portion between the front cross member 20 and the rear cross member 22. In this embodiment, the protruding portion 26 is formed to protrude downward toward the lower end of the longitudinal member 18. However, the present invention is not limited to this specific configuration. For example, as long as the protruding portion 26 protrudes in a direction intersecting the longitudinal direction (i.e., direction in which the longitudinal member 18 extends), the protruding portion 26 may protrude in the vehicle width direction (e.g., inward or outward in the vehicle width direction) or in the vertical direction (e.g., upward in the vertical direction).

The straight portion 24 has a recess portion 28 that is recessed upward to form an L-shaped cross section, at a position adjacent to and inward of the protruding portion 26 in the vehicle width direction. Because of the protruding portion 26 and the recess portion 28 provided at positions adjacent to each other in the vehicle width direction, there is provided a polygonal cross-section portion 30 having a polygonal cross section taken along a plane perpendicular to the longitudinal direction of the vehicle. As seen in the cross section such as shown in FIG. 6, the polygonal cross-section portion 30 includes, for example, six vertices (i.e., first vertex 32a, second vertex 32b, third vertex 32c, fourth vertex 32d, fifth vertex 32e, sixth vertex 32f), and six walls each containing a plane formed by connecting adjacent two vertices (i.e., first wall 34a, second wall 34b, third wall 34c, fourth wall 34d, fifth wall 34e, sixth wall 34f).

To be more specific, as seen in FIG. 6, the first wall 34a defines an upper side of the upper wall portion 18a of each of the right and left longitudinal members 18, 18. The first wall 34a contains a flat plane connecting the first vertex 32a and the second vertex 32b. In other words, the upper wall portion 18a (i.e., a first half portion) has the first wall 34a extending in the vehicle width direction.

The second wall 34b defines a lateral side located at an outer side in the vehicle width direction. The second wall 34b contains a generally flat plane connecting the second vertex 32b and the third vertex 32c. To be more specific, the upper wall portion 18a has a first outer vertical wall extending in the vertical direction, and the lower wall portion 18b (i.e., a second half portion) has a second outer vertical wall extending parallel to the first outer vertical wall. When the upper wall portion 18a and the lower wall portion 18b are joined together to form a closed hollow portion 25, the first outer vertical wall and the second outer vertical wall form an outer wall (i.e., second wall 34b) of the closed hollow portion. The outer wall of the closed hollow portion 25 constitutes the protruding portion 26.

The third wall 34c defines a lower side of the lower wall portion 18b. The third wall 34c contains a plane connecting the third vertex 32c and the fourth vertex 32d. The third wall 34c contains a composite plane consisting of curved planes and a flat plane. In other words, the lower wall portion 18b has the third wall 34c extending in the vehicle width direction.

The fourth wall 34d contains a generally flat plane connecting the fourth vertex 32d and the fifth vertex 32e. The fifth wall 34e contains a generally flat plane connecting the fifth vertex 32e and the sixth vertex 32f. A rounded wall in the shape of a circular arc cross section is formed between the fourth wall 34d and the fifth wall 34e. To be more specific, the lower wall portion 18b has the fourth wall 34d, the fifth wall 34e, and the rounded wall connecting the fourth wall 34d and the fifth wall 34e. Further, the sixth wall 34f defines a lateral side located at an inner side in the vehicle width direction. The sixth wall 34f contains a plane connecting the sixth vertex 32f and the first vertex 32a. To be more specific, the upper wall portion 18a has a first inner vertical wall generally extending in the vertical direction, and the lower wall portion 18b has a second inner vertical wall extending in the vertical direction. When the upper wall portion 18a and the lower wall portion 18b are joined together to form a closed hollow portion 25, the first inner vertical wall and the second inner vertical wall form an inner wall (i.e., sixth wall 34f) of the closed hollow portion 25. It should be noted that the protruding portion 26 is formed inside the lower wall portion 18b (i.e., a second half portion), and the recess portion 28 is formed outside the lower wall portion 18b adjacent to the protruding portion 26 in the vehicle width direction.

The protruding portion 26 is formed by a part of the second wall 34b, the third wall 34c, and the fourth wall 34d that are continuous to each other. The recess portion 28 adjacent to the protruding portion 26 is formed by the fourth wall 34d and the fifth wall 34e that are continuous to each other.

As seen in FIG. 6, the breadth (H2) of the protruding portion 26 in the vehicle width direction is smaller than the breadth (H1) of the longitudinal member 18 in the vehicle width direction (i.e., H1>H2).

Figure 5:
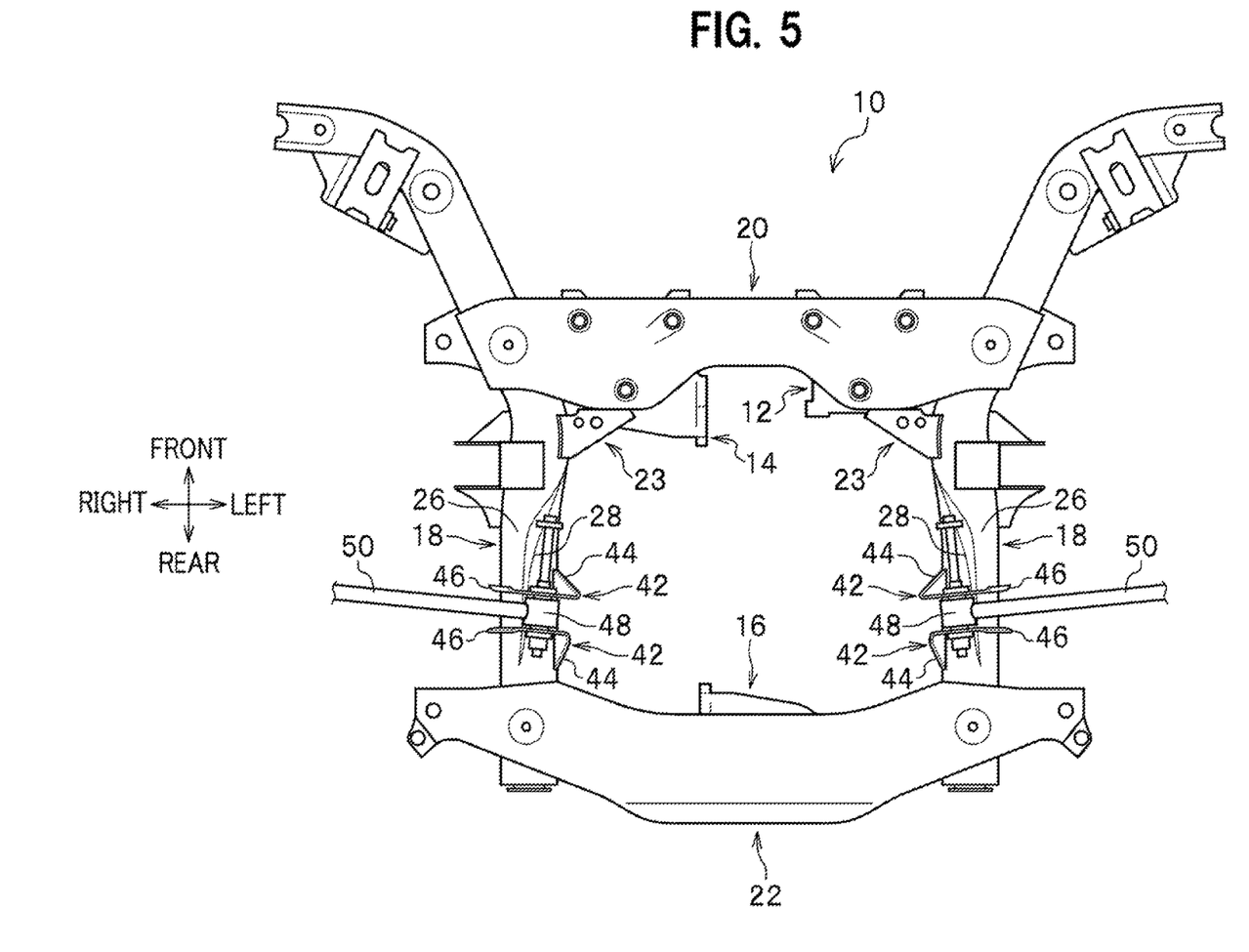
FIG. 5 is a bottom view illustrating a pair of brackets to which a suspension arm has been attached.

As viewed from below, the protruding portion 26 has a widened portion 36, at which the breadth of the protruding portion 26 in the vehicle width direction becomes gradually wider toward the front side of the vehicle. The breadth of the widened portion 36 in the vehicle width direction takes the maximum value at a position adjacent to the gusset 23 in a front side of the rear subframe. An oblique portion 40 having an oblique surface 38 is provided in the protruding portion 26 at a front side of the widened portion 36; the oblique surface 38 slants from the outer side toward the inner side in the vehicle width direction. As seen in FIGS. 3 and 5, the protruding portion 26 has a widened bottom surface (of the widened portion 36), at which the breadth of the protruding portion 26 in the vehicle width direction becomes gradually wider toward the front side of the vehicle. The widened bottom surface has an oblique edge extending toward the central portion of the front cross member 20. The oblique portion 40 is continuous with the recess portion 28 that is located rearward of the oblique portion 40.

Figure 7:
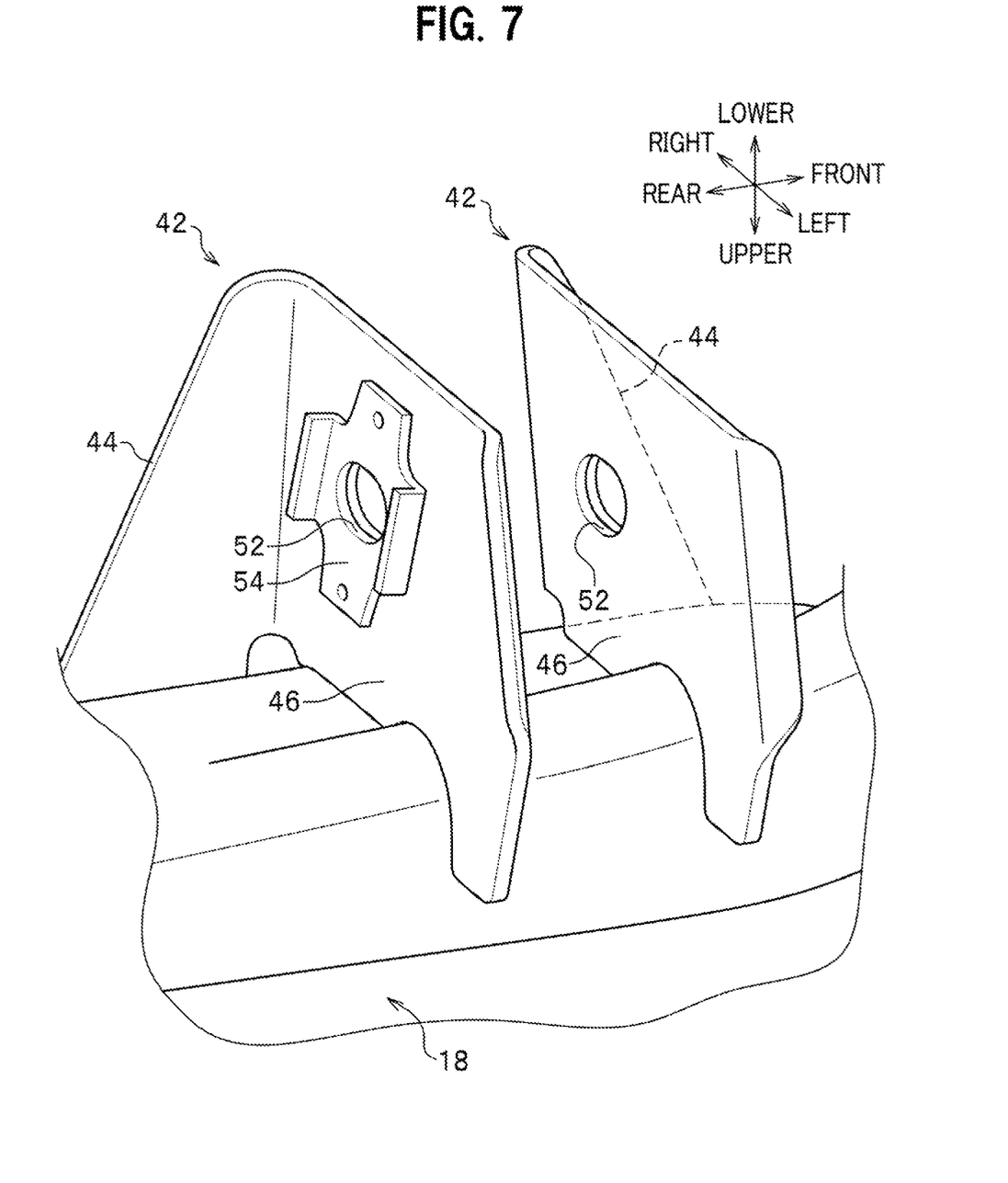
FIG. 7 is an enlarged perspective view of the pair of brackets as viewed from below.

As seen in FIG. 5, a pair of brackets 42, 42 are disposed on each of the right and left longitudinal members 18, 18. The brackets 42, 42 extend across the protruding portion 26 in the vehicle width direction. The brackets 42, 42 are disposed oppositely to each other and spaced apart in the longitudinal direction of the vehicle. The brackets 42, 42 are symmetrically designed about the longitudinal direction of the vehicle. As seen in FIG. 7, each bracket 42 includes a longitudinal plate portion 44 and a transverse plate portion 46; the transverse plate portion 46 extends in the vehicle width direction from one side to another side of the longitudinal member 18, and the longitudinal plate portion 44 extends in the longitudinal direction of the vehicle from one end of the transverse plate portion 46 that is located in the one side of the longitudinal member 18. The longitudinal plate portion 44 and the transverse plate portion 46 form a continuous surface at one end of the bracket 42 in the vehicle width direction (i.e., at the one end of the transverse plate portion 46), while intersecting each other at right angles at the one end of the bracket 42 in the vehicle width direction.

The transverse plate portions 46 of the pair of brackets 42, 42 have a substantially rectangular shape as viewed in the longitudinal direction of the vehicle, and are disposed spaced apart from each other by a predetermined distance and substantially parallel and opposite to each other. The longitudinal plate portions 44, 44 of the pair of brackets 42, 42 have a substantially right-angled triangular shape as viewed from side; one longitudinal plate portion 44 extends toward the front side of the vehicle and the other longitudinal plate portion 44 extends toward the rear side of the vehicle.

As seen in FIG. 7, a support plate 54 having a support hole 52 is joined to the transverse plate portion 46 of each bracket 42. A mounting bolt 50 extending through a bush 48 is smoothly supported by the pair of brackets 42, 42 and the support plates 54, 54. With this configuration, as seen in FIG. 5, the pair of brackets 42, 42 serve as arm attachment brackets. A suspension arm 56 extends in the vehicle width direction, and one end of the suspension arm 56 is rotatably mounted to the brackets 42, 42 through the bush 48.

As seen in FIG. 3, a pair of right and left gussets 23, 23 are disposed laterally symmetrically to each other as viewed from below; each of the right and left gussets 23, 23 has a substantially triangular shape. As seen in FIG. 4, each gusset 23 has an oblique portion 60 extending obliquely between the longitudinal member 18 and the front cross member 20. The oblique portion 60 has an oblique surface 62 that approaches inward in the vehicle width direction with the increasing distance from the longitudinal member 18 toward the front cross member 20. As viewed from below, the oblique portion 60 is disposed along a direction in which the oblique edge of the widened bottom surface of the widened portion 36 extends toward the front cross member 20 (see FIGS. 3 and 5). To be more specific, the oblique edges of the widened portions 36 of the pair of right and left longitudinal members 18, 18 extend toward the right and left oblique portions of the front cross member 20, and the pair of gussets 23, 23 are disposed such that the oblique portions 60 are disposed along extension lines connecting the oblique edges and the right and left oblique portions of the front cross member 20.

Figure 8:
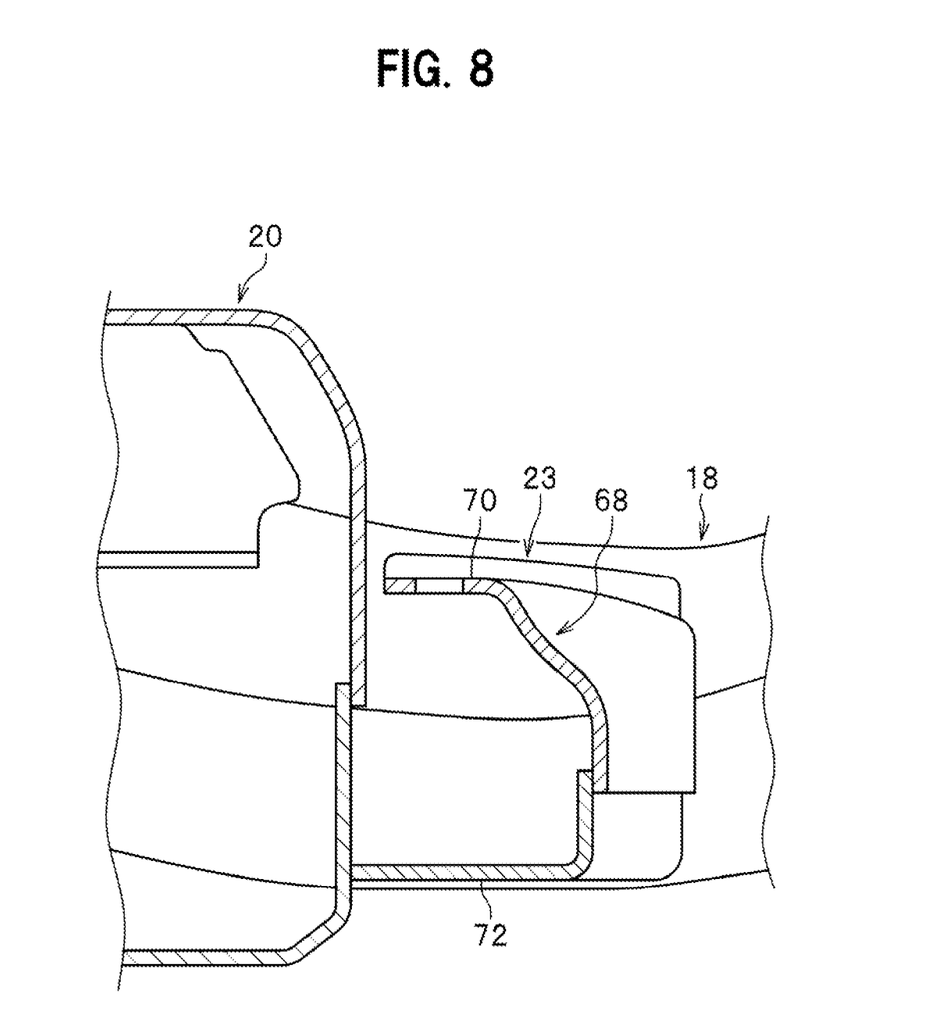
FIG. 8 is an enlarged sectional view taken along the line VIII-VIII of FIG. 3.

As seen in FIG. 8, each of the right and left gussets 23, 23 has a U-shaped portion 68 having a U-shaped vertical cross section. The U-shaped portion 68 consists of an upper gusset 70 having a generally L-shaped cross section and a lower gusset 72 having a generally L-shaped cross section, which are joined together.

The vehicle, in which the rear subframe 10 according to this embodiment has been embedded, is basically configured as described above. The operational advantages of the rear subframe structure will be described below.

In general, each of the right and left longitudinal members 18, 18 is lower in strength at a portion between the front cross member 20 and the rear cross member 22 as compared with portions of the right and left longitudinal members 18, 18 where the front cross member 20 and the rear cross member 22 are provided. For this reason, according to this embodiment, each of the pair of right and left longitudinal members 18, 18 has the protruding portion 26 that protrudes in a downward direction intersecting the longitudinal direction (i.e., direction in which the longitudinal member 18 extends), between the front cross member 20 and the rear cross member 22. According to this embodiment, providing the protruding portion 26 makes it possible to enhance the stiffness and the strength of the longitudinal member 18 in the longitudinal direction of the vehicle as compared with an alternative configuration in which each of the pair of right and left longitudinal members has a flat surface without providing a protruding portion. With this configuration of the above exemplified embodiment, the stiffness and the strength of the longitudinal member 18 at a portion between the front cross member 20 and the rear cross member 22 can be enhanced. As a result, a power unit P disposed between the front cross member 20 and the rear cross member 22 can be protected adequately against a load applied from the longitudinal direction of the vehicle.

In the above exemplified embodiment, the breadth (H2) of the protruding portion 26 in the vehicle width direction is smaller than the breadth (H1) of the longitudinal member 18 in the vehicle width direction (i.e., H1>H2). With this configuration of the above exemplified embodiment, the right and left longitudinal members 18, 18 each having a polygonal cross-section (i.e., hexagonal cross-section as shown in FIG. 6) are formed, so that the stiffness and the strength of each of the right and left longitudinal members 18, 18 can be enhanced against a load inputted from the longitudinal direction of the vehicle.

In the above exemplified embodiment, the recess portion 28 is provided at a position adjacent to the protruding portion 26 in the vehicle width direction. With this configuration of the above exemplified embodiment, the recess portion 28 serves as a flank or clearance when the mounting bolt 50 is attached to the brackets 42, 42, so that the workability for mounting the suspension arm 56 can be improved.

In the above exemplified embodiment, each of the pair of right and left longitudinal members 18, 18 has the straight portion 24 that extends substantially straight in the longitudinal direction of the vehicle, between the front cross member 20 and the rear cross member 22. With this configuration of the above exemplified embodiment, providing the straight portion 24 makes it possible to enhance the stiffness and the strength of the longitudinal member 18 against a load inputted from the longitudinal direction of the vehicle.

In the above exemplified embodiment, the gusset 23 having the oblique portion 60 is provided at the connecting portion where the longitudinal member 18 and the front cross member 20 are connected, and as viewed from below, the oblique portion 60 of the gusset 23 is disposed along a direction in which the oblique edge of the widened portion 36 of the protruding portion 26 extends toward the front cross member 20. With this configuration of the above exemplified embodiment, the oblique portion 60 is substantially aligned with the oblique edge of the widened portion 36. Further, the oblique portion 60 is disposed along an extension line connecting the oblique edge and the oblique portion of the front cross member 20. This configuration makes it possible to improve load transfer, during rear-end collision, from the right and left longitudinal members 18 to the front cross member 20.

In the above exemplified embodiment, each of the pair of right and left longitudinal members 18, 18 includes the protruding portion 26 that protrudes downward (in a direction intersecting the longitudinal direction), so as to improve the stiffness and the strength of the longitudinal member 18 in the longitudinal direction of the vehicle. However, the stiffness and the strength of the longitudinal member 18 in the vehicle width direction may be insufficient as compared with those in the vertical direction. For this reason, the pair of brackets 42, 42 are disposed to extend across the protruding portion 26 of each of the right and left longitudinal members 18, 18 in the vehicle width direction, at a portion of the longitudinal member 18 where the protruding portion 26 is formed. According to this exemplified embodiment, providing the pair of brackets 42, 42 extending across the protruding portion 26 in the vehicle width direction makes it possible to enhance the stiffness and the strength of the longitudinal member 18 in the vehicle width direction.

Further, in the above exemplified embodiment, each of the pair of right and left brackets 42, 42 includes the transverse plate portion 46 and the longitudinal plate portion 44; the transverse plate portion 46 extends in the vehicle width direction from one side to another side of the longitudinal member 18, and the longitudinal plate portion 44 extends in the longitudinal direction from one end of the transverse plate portion 46 that is located in the one side of the longitudinal member 18. With this configuration of the above exemplified embodiment, providing the longitudinal plate portion 44 and the transverse plate portion 46 that intersect each other at right angles makes it possible to enhance the stiffness and the strength of the bracket 42 per se as well as to enhance the stiffness and the strength of the longitudinal member 18.

Further, in the above exemplified embodiment, the pair of brackets 42, 42 serve as arm attachment brackets to which the suspension arm 56 is attached. With this configuration of the above exemplified embodiment, the improved support stiffness for the suspension arm 56 and the enhanced stiffness and strength of the longitudinal member 18 can be achieved simultaneously.

The invention claimed is:

1. A rear subframe structure including a rear subframe disposed on a rear side of a vehicle, the rear subframe comprising:
    a pair of right and left longitudinal members extending in a longitudinal direction of the vehicle; and
    a front cross member extending in a vehicle width direction between the pair of right and left longitudinal members, and a rear cross member extending in the vehicle width direction between the pair of right and left longitudinal members, the front cross member and the rear cross member being spaced apart in the longitudinal direction by a predetermined distance,
    wherein each of the pair of right and left longitudinal members has a protruding portion between the front cross member and the rear cross member, the protruding portion protruding in a direction intersecting the longitudinal direction,
    wherein as viewed from below, the protruding portion has a widened portion, at which a breadth of the protruding portion in the vehicle width direction becomes gradually wider toward a front side of the vehicle,
    wherein a gusset having an oblique portion is provided at a connecting portion where each of the right and left longitudinal members and the front cross member are connected, and
    wherein the oblique portion of the gusset and an oblique surface constituting the widened portion are arranged continuously.

2. The rear subframe structure according to claim 1, wherein a breadth of the protruding portion in the vehicle width direction is smaller than a breadth of each of the right and left longitudinal members in the vehicle width direction.

3. The rear subframe structure according to claim 1, wherein each of the pair of right and left longitudinal members a has straight portion between the front cross member and the rear cross member, the straight portion extending substantially straight in the longitudinal direction.

4. The rear subframe structure according to claim 1, further comprising a pair of brackets disposed on each of the right and left longitudinal members,
    wherein the pair of brackets extend across the protruding portion of each of the right and left longitudinal members in the vehicle width direction.

5. The rear subframe structure according to claim 4, wherein each of the pair of brackets comprises a transverse plate portion and a longitudinal plate portion, the transverse plate portion extending in the vehicle width direction from one side to another side of each of the right and left longitudinal members, and the longitudinal plate portion extending in the longitudinal direction from one end of the transverse plate portion that is located on the one side of each of the right and left longitudinal members.

6. The rear subframe structure according to claim 4, wherein the pair of brackets are arm attachment brackets to which a suspension arm is attached.

7. A rear subframe structure including a rear subframe disposed on a rear side of a vehicle, the rear subframe comprising:
    a pair of right and left longitudinal members extending in a longitudinal direction of the vehicle; and
    a front cross member extending in a vehicle width direction between the pair of right and left longitudinal members, and a rear cross member extending in the vehicle width direction between the pair of right and left longitudinal members, the front cross member and the rear cross member being spaced apart in the longitudinal direction by a predetermined distance,
    wherein each of the pair of right and left longitudinal members has a protruding portion between the front cross member and the rear cross member, the protruding portion protruding downward of the vehicle in a direction intersecting the longitudinal direction,
    wherein a pair of brackets are disposed on each of the right and left longitudinal members, the pair of brackets extending across the protruding portion of each of the right and left longitudinal members in the vehicle width direction, wherein the pair of brackets are arm attachment brackets to which a suspension arm is attached, wherein each bracket has a transverse plate portion extending in the vehicle width direction, and wherein the suspension arm extending in the vehicle width direction is attached to the transverse plate portion.

* * * * *